US011981286B2

(12) United States Patent
Anand et al.

(10) Patent No.: US 11,981,286 B2
(45) Date of Patent: May 14, 2024

(54) METHOD AND SYSTEM FOR VEHICLE ANTI-THEFT AUTHENTICATION, STORAGE MEDIUM, AND VEHICLE

(71) Applicant: NIO TECHNOLOGY (ANHUI) CO., LTD, Hefei (CN)

(72) Inventors: Ashish Anand, Shanghai (CN); Garry Cooper, Shanghai (CN)

(73) Assignee: NIO TECHNOLOGY (ANHUI) CO., LTD, Hefei (CN)

( * ) Notice: Subject to any disclaimer, the term of this patent is extended or adjusted under 35 U.S.C. 154(b) by 10 days.

(21) Appl. No.: 18/053,579

(22) Filed: Nov. 8, 2022

(65) Prior Publication Data
US 2023/0142262 A1    May 11, 2023

(30) Foreign Application Priority Data
Nov. 11, 2021 (CN) .......................... 202111332190.3

(51) Int. Cl.
*B60R 25/24* (2013.01)
*B60R 25/04* (2013.01)

(52) U.S. Cl.
CPC .............. *B60R 25/24* (2013.01); *B60R 25/04* (2013.01)

(58) Field of Classification Search
CPC ................................ B60R 25/24; B60R 25/04
See application file for complete search history.

(56) References Cited

U.S. PATENT DOCUMENTS

| 10,911,949 | B2 | 2/2021 | Nolscher et al. |
| 2009/0199292 | A1 | 8/2009 | Sakamoto et al. |
| 2019/0217816 | A1 | 7/2019 | Lee |

FOREIGN PATENT DOCUMENTS

EP    3654299    5/2020

OTHER PUBLICATIONS

Extended Search Report for European Patent Application No. 22206806.6, dated Apr. 4, 2023, 6 pages.

*Primary Examiner* — Robert L Deberadinis
(74) *Attorney, Agent, or Firm* — Sheridan Ross P.C.

(57) ABSTRACT

The disclosure relates to the field of vehicles, and particularly, to a method and system for vehicle anti-theft authentication, a storage medium, and a vehicle including the system. The method includes the following steps: determining whether key information in a vehicle key matches preset information; performing primary anti-theft authentication between a vehicle body controller and a gateway in a case of matching, to determine whether to activate a vehicle basic function; and performing secondary anti-theft authentication between the gateway and a power controller in a case of meeting a preset condition, to determine whether to activate a vehicle driving function, where the preset condition includes that the vehicle basic function has been activated.

16 Claims, 4 Drawing Sheets

METHOD AND SYSTEM FOR VEHICLE ANTI-THEFT AUTHENTICATION, STORAGE MEDIUM, AND VEHICLE

CROSS-REFERENCE TO RELATED APPLICATIONS

This application claims the benefit of China Patent Application No. 202111332190.3 filed Nov. 11, 2021, the entire contents of which are incorporated herein by reference in its entirety.

TECHNICAL FIELD

The disclosure relates to vehicle control technologies, and specifically, to a method and system for vehicle anti-theft authentication, a storage medium, and a vehicle.

BACKGROUND

As science and technologies advance, requirements of users for vehicle safety and reliability are increasingly high. At present, existing vehicle anti-theft is mainly reflected in the anti-entry alarm. But when a vehicle is parked in a remote area, a thief can still break a window to enter and start the vehicle. Therefore, the conventional anti-theft technology can no longer meet requirements of users for vehicle anti-theft.

BRIEF SUMMARY

According to an aspect, the disclosure provides a method for vehicle anti-theft authentication, including the following steps: determining whether key information in a vehicle key matches preset information; performing primary anti-theft authentication between a vehicle body controller and a gateway in a case of matching, to determine whether to activate a vehicle basic function; and performing secondary anti-theft authentication between the gateway and a power controller in a case of meeting a preset condition, to determine whether to activate a vehicle driving function, where the preset condition comprises that the vehicle basic function has been activated.

As an alternative or addition to the above solution, in the method for vehicle anti-theft authentication according to an embodiment of the disclosure, the primary anti-theft authentication is one-way authentication or two-way authentication; and the secondary anti-theft authentication is one-way authentication or two-way authentication.

As an alternative or addition to the above solution, in the method for vehicle anti-theft authentication according to an embodiment of the disclosure, the performing secondary anti-theft authentication between the gateway and a power controller includes: performing the secondary anti-theft authentication between the gateway and a front motor controller; and performing the secondary anti-theft authentication between the gateway and a rear motor controller.

As an alternative or addition to the above solution, in the method for vehicle anti-theft authentication according to an embodiment of the disclosure, the primary anti-theft authentication includes: performing, by the gateway, first authentication according to first authentication information received from the vehicle body controller, and transmitting second authentication information to the vehicle body controller in a case that the first authentication succeeds; performing, by the vehicle body controller, second authentication according to the second authentication information received from the gateway, and transmitting third authentication information and the key information to the gateway in a case that the second authentication succeeds; and performing, by the gateway, third authentication according to the third authentication information received from the vehicle body controller, and activating the vehicle basic function in a case that the third authentication succeeds.

As an alternative or addition to the above solution, in the method for vehicle anti-theft authentication according to an embodiment of the disclosure, the secondary anti-theft authentication includes: performing, by the power controller, fourth authentication according to fourth authentication information received from the gateway, and transmitting fifth authentication information to the gateway in a case that the fourth authentication succeeds; performing, by the gateway, fifth authentication according to the fifth authentication information received from the power controller, and transmitting sixth authentication information and the key information to the power controller in a case that the fifth authentication succeeds; and performing, by the power controller, sixth authentication according to the sixth authentication information received from the gateway, and activating the vehicle driving function in a case that the sixth authentication succeeds.

As an alternative or addition to the above solution, in the method for vehicle anti-theft authentication according to an embodiment of the disclosure, the preset condition further include: one or more sensors determine that a driver is present.

As an alternative or addition to the above solution, in the method for vehicle anti-theft authentication according to an embodiment of the disclosure, the first authentication information includes: the vehicle identification number, or the immobilizer security key, or a combination thereof.

As an alternative or addition to the above solution, in the method for vehicle anti-theft authentication according to an embodiment of the disclosure, the fourth authentication information includes: the vehicle identification number, or the immobilizer security key, or a combination thereof.

According to another aspect, the disclosure provides a system for vehicle anti-theft authentication, including: a vehicle body controller, configured to determine whether key information in a vehicle key matches preset information; a gateway, configured to perform primary anti-theft authentication with the vehicle body controller in a case that the key information matches the preset information, to determine whether to activate a vehicle basic function; and a power controller, configured to perform secondary anti-theft authentication with the gateway in a case of meeting a preset condition, to determine whether to activate a vehicle driving function, where the preset condition includes that the vehicle basic function has been activated.

As an alternative or addition to the above solution, in the system for vehicle anti-theft authentication according to an embodiment of the disclosure, the primary anti-theft authentication is one-way authentication or two-way authentication; and the secondary anti-theft authentication is one-way authentication or two-way authentication.

As an alternative or addition to the above solution, in the system for vehicle anti-theft authentication according to an embodiment of the disclosure, the power controller includes a front motor controller and a rear motor controller, and the front motor controller and the rear motor controller are configured to respectively perform the secondary anti-theft authentication with the gateway.

As an alternative or addition to the above solution, in the system for vehicle anti-theft authentication according to an embodiment of the disclosure, the primary anti-theft authentication includes: performing, by the gateway, first authentication according to first authentication information received from the vehicle body controller, and transmitting second authentication information to the vehicle body controller in a case that the first authentication succeeds; performing, by the vehicle body controller, second authentication according to the second authentication information received from the gateway, and transmitting third authentication information and the key information to the gateway in a case that the second authentication succeeds; and performing, by the gateway, third authentication according to the third authentication information received from the vehicle body controller, and activating the vehicle basic function in a case that the third authentication succeeds.

As an alternative or addition to the above solution, in the system for vehicle anti-theft authentication according to an embodiment of the disclosure, the secondary anti-theft authentication includes: performing, by the power controller, fourth authentication according to fourth authentication information received from the gateway, and transmitting fifth authentication information to the gateway in a case that the fourth authentication succeeds; performing, by the gateway, fifth authentication according to the fifth authentication information received from the power controller, and transmitting sixth authentication information and the key information to the power controller in a case that the fifth authentication succeeds; and performing, by the power controller, sixth authentication according to the sixth authentication information received from the gateway, and activating the vehicle driving function in a case that the sixth authentication succeeds.

As an alternative or addition to the above solution, in the system for vehicle anti-theft authentication according to an embodiment of the disclosure, the preset condition further includes: one or more sensors determine that a driver is present.

As an alternative or addition to the above solution, in the system for vehicle anti-theft authentication according to an embodiment of the disclosure, the first authentication information includes: the vehicle identification number, or the immobilizer security key, or a combination thereof.

As an alternative or addition to the above solution, in the system for vehicle anti-theft authentication according to an embodiment of the disclosure, the fourth authentication information includes: the vehicle identification number, or the immobilizer security key, or a combination thereof.

According to still another aspect, the disclosure provides a computer-readable storage medium storing program instructions executable by a processor. The program instructions, when executed by the processor, perform the method for vehicle anti-theft authentication as described in any one of the foregoing embodiments according to the aspect of the disclosure.

According to still another aspect, the disclosure provides a vehicle, including the system for vehicle anti-theft authentication as described in any one of the foregoing embodiments according to the aspect of the disclosure.

In some embodiments according to the disclosure, first, the validity of the key is authenticated; then, the key domain authentication between the vehicle body controller and the gateway is performed, and if the authentication succeeds, the vehicle basic function is activated; and then, the transmission system authentication between the gateway and the power controller (e.g., a motor or an engine controller) is performed, and if the authentication succeeds, the vehicle driving function is activated. Through performing the above authentication processes in sequence, the security of the anti-theft system can be improved, and the step-by-step activation of the vehicle functions is implemented.

BRIEF DESCRIPTION OF THE SEVERAL VIEWS OF THE DRAWINGS

The above-mentioned and/or other aspects and advantages of the disclosure will become more apparent and more readily appreciated from the following description of various aspects in conjunction with the accompanying drawings, in which the same or similar units are denoted by the same reference numerals. In the drawings.

DETAILED DESCRIPTION

In this specification, the disclosure is described more fully with reference to the accompanying drawings in which schematic embodiments of the disclosure are illustrated. However, the disclosure may be implemented in different forms, and should not be construed as being limited to the embodiments provided herein. The embodiments provided herein are intended to make the disclosure of this specification full and complete, to convey the scope of protection of the disclosure more fully to those skilled in the art.

It should be noted that the terms such as "first", "second", "primary" and "secondary" herein are used to distinguish similar objects, and are not necessarily used to describe an order of objects in time, space, size, etc. Furthermore, unless otherwise specified, the terms "including/comprising", "having" and similar expressions herein are intended to mean a non-exclusive inclusion. In addition, the term "vehicle" or other similar terms herein includes common motor vehicles, such as passenger vehicles (including sport utility vehicles, buses, trucks, etc.), various types of commercial vehicles, and also includes hybrid vehicles, electric vehicles, plug-in hybrid electric vehicles, etc. A hybrid vehicle is a vehicle with two or more power sources, such as a vehicle powered by a gasoline engine and an electric motor.

The vehicle anti-theft described herein aims to prevent the vehicle from being illegally entered, started, or driven away without a valid key. The disclosure proposes a three-step authentication approach for vehicle anti-theft. That is, in a first step, the validity of the key (e.g., a smart key) is authenticated, to prevent unauthorized personnel or invalid keys from illegally entering the vehicle or activating the vehicle functions; in a second step, the key domain authentication between the vehicle body controller and the gateway is performed, and if the authentication succeeds, the vehicle basic function can be activated; and in a third step, the transmission system authentication between the gateway and the power controller is performed, and if the authentication succeeds, the vehicle driving function is activated, that is, the vehicle controller allows the vehicle to shift to "drive gear (D gear)" or "reverse gear (R gear)". By performing the above three authentications in sequence, the security and reliability of the anti-theft system can be improved, and the step-by-step activation of the vehicle function can be implemented.

Figure 1:
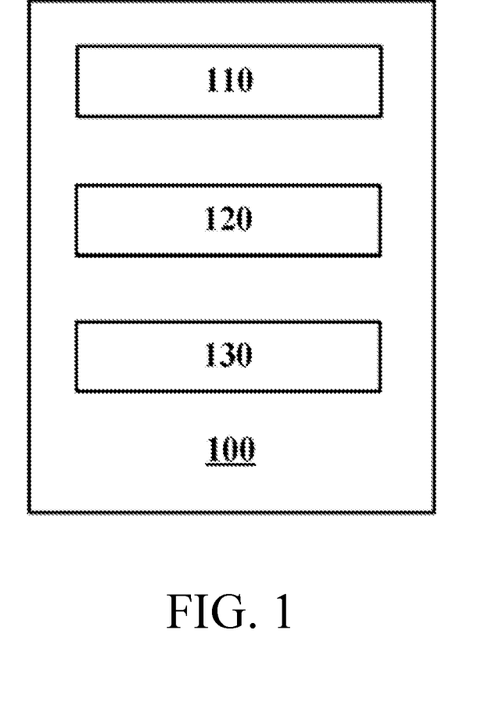
FIG. 1 is a schematic block diagram of a system 100 for vehicle anti-theft authentication according to an embodiment of the disclosure.

Referring to FIG. 1, FIG. 1 is a schematic block diagram of a system 100 for vehicle anti-theft authentication according to an embodiment of the disclosure.

In this embodiment of FIG. 1, the system 100 includes a vehicle body controller 110, a gateway 120, and a motor controller 130. The system for vehicle anti-theft authentication as shown in FIG. 1 is an authentication system applied to an electric vehicle. Therefore, the motor controller 130 participates in implementation. In a case of being applied to a fuel vehicle, the motor controller 130 is replaced by an engine controller. In the following description, the electric vehicle is described as an example. In some embodiments according to the disclosure, the system 100 may further include one or more sensors, configured to detect presence of a driver.

Exemplarily, when a user inserts a key into an ignition apparatus or brings a smart key into the vehicle, the key may transmit an electronic code (i.e., key information) stored therein to the vehicle body controller 110. The vehicle body controller 110 may determine whether the received electronic code matches preset information in the vehicle body controller 110. If the vehicle body controller 110 determines that the electronic code matches the preset information, it indicates that the key is valid, and the following key domain authentication phase is entered. If the vehicle body controller 110 determines that the received electronic code does not match the preset information, it indicates that the key is invalid, and a whole authentication process fails and ends. In a case that the authentication process fails, the system 100 (e.g., the vehicle body controller 110) may issue alarm information, to alert that there may be an illegal approach or entry to the vehicle.

During the key domain authentication phase, primary anti-theft authentication is performed between the vehicle body controller 110 and the gateway 120. If the primary anti-theft authentication succeeds, a vehicle basic function is activated. The vehicle basic function described in the disclosure includes but is not limited to one or more of the following: a lighting management function, a remote service function, an infotainment function, a hands-free call function, a wiper/cleaning function, a charging function, a software update function, a comfort experience function, etc. If the primary anti-theft authentication fails, the system 100 determines that the whole authentication process fails and ends the process. The system 100 may also issue the alarm information, to alert that there may be an illegal approach or entry to the vehicle.

In a case that a preset condition is met, the system 100 may enter a transmission system authentication phase. The above preset condition includes that the primary anti-theft authentication has succeeded, that is, the vehicle basic function has been activated. In some embodiments according to the disclosure, the preset condition may further include that one or more sensors detect that a driver is present. The one or more sensors may include one or more of the following: a pressure sensor disposed at a driving position, an image sensor disposed in front of the driving position, and a driving seat belt status sensor.

During the transmission system authentication phase, secondary anti-theft authentication is performed between the gateway 120 and the motor controller 130. If the secondary anti-theft authentication succeeds, a vehicle driving function is activated, that is, the vehicle is allowed to shift to "drive gear (D gear)" or "reverse gear (R gear)". If the secondary anti-theft authentication fails, the system 100 determines that the whole authentication process fails and ends the process. The system 100 may also issue the alarm information, to alert that there may be an illegal approach or entry to the vehicle. In some embodiments according to the disclosure, the motor controller 130 may include a front motor controller 131 and a rear motor controller 132. The secondary anti-theft authentication may be performed between the front motor controller 131 and the gateway 120, and between the rear motor controller 132 and the gateway 120, respectively. If both authentications succeed, the vehicle driving function is activated; and if both authentications fail or one of the authentications fails, the system 100 determines that the whole authentication process fails and ends the process.

The primary anti-theft authentication in the key domain authentication phase and the secondary anti-theft authentication in the transmission system authentication phase are detailed below with FIG. 2 and FIG. 3 as examples. It should be noted that, the primary anti-theft authentication between the vehicle body controller 110 and the gateway 120 and the secondary anti-theft authentication between the gateway 120 and the motor controller 130 (e.g., the front motor controller 131 and the rear motor controller 132) may be implemented in the form of one-way authentication or in the form of two-way authentication. The two-way authentication is described as an example below.

Figure 2:
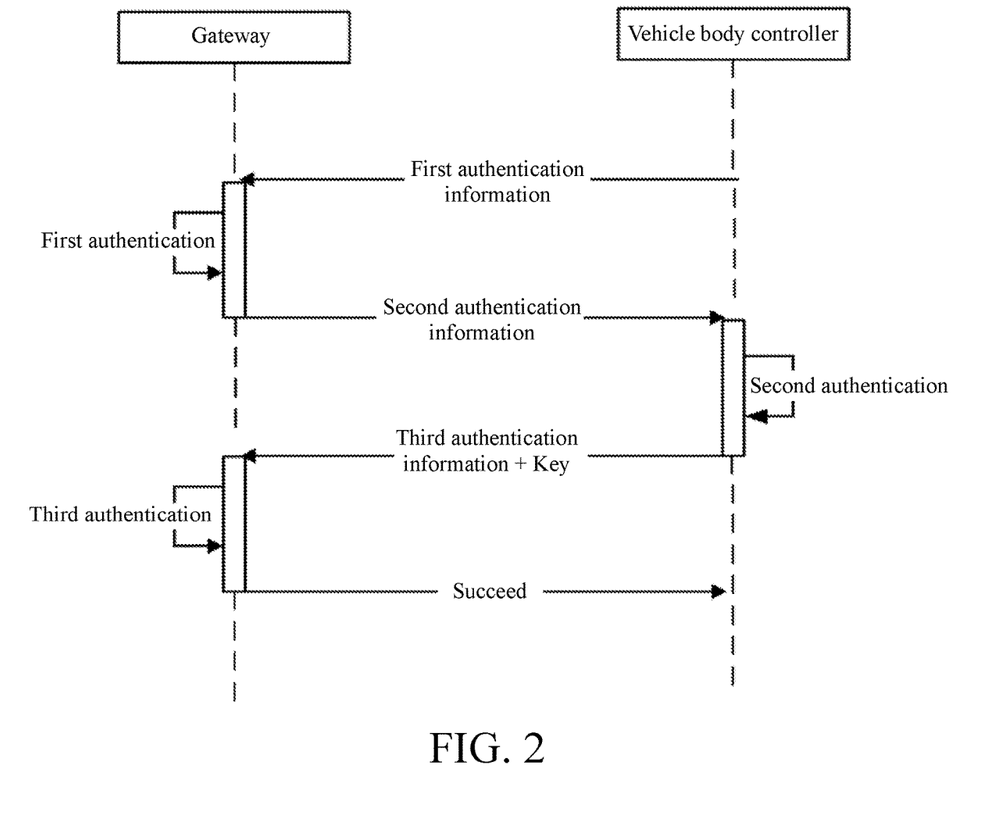
FIG. 2 is a schematic flowchart of a primary anti-theft authentication process according to an embodiment of the disclosure.

Referring to FIG. 2, FIG. 2 is a schematic flowchart of a primary anti-theft authentication process according to an embodiment of the disclosure.

When the vehicle body controller 110 determines that the electronic code in the key matches the preset information in the vehicle body controller 110, the system 100 triggers the key domain authentication. Exemplarily, the vehicle body controller 110 securely transmits the key information to the gateway by means of the two-way authentication.

Exemplarily, in a vehicle end-of-line (EOL) detection process, the electronic code for vehicle identification and anti-theft authentication, such as a vehicle identification number (VIN), an immobilizer security key (ISK), etc., is stored in the vehicle body controller, the gateway, and the motor controller.

As shown in FIG. 2, the vehicle body controller first generates first authentication information and transmits the first authentication information to the vehicle gateway. Exemplarily, the vehicle body controller may generate and store a first random number (RND1) and a first seed (Seed1), encrypt the first random number and the first seed together with the vehicle identification number (e.g., the last 8 bytes of the VIN), and transmit the encrypted first random number, first seed, and vehicle identification number to the gateway. Exemplarily, seed information may be stored in an in-vehicle memory in a vehicle production process; alternatively, a seed sequence may be randomly generated during the authentication process, and the seed is generated out of the seed sequence.

After receiving the first authentication information, the gateway decrypts the first authentication information, and extracts first valid data from the first authentication information for first authentication. Exemplarily, the gateway may extract Seed1+VIN from RND1+Seed1+VIN, and performs authentication thereon based on the VIN information stored in the EOL process. If the extracted VIN information matches the stored VIN, the first authentication succeeds.

The gateway transmits second authentication information to the vehicle body controller after the first authentication succeeds. Exemplarily, the gateway may generate and store a second random number (RND2) and a second seed (Seed2), encrypt the second random number and the second seed together with the first seed (Seed1), and transmit the encrypted second random number, second seed, and first seed to the vehicle body controller.

After receiving the second authentication information, the vehicle body controller decrypts the second authentication information, and extracts second valid data from the second authentication information for second authentication. Exemplarily, the gateway may extract Seed2+Seed1 from RND2+Seed2+Seed1, and performs authentication thereon based on the previously stored Seed1. If the extracted Seed1 matches the stored Seed1, the second authentication succeeds.

The vehicle body controller transmits third authentication information and the key information (KeyData) to the gateway after the second authentication succeeds. Exemplarily, the vehicle body controller may generate a third random number (RND3), encrypt the third random number together with the key information and the Seed2, and transmit the encrypted third random number, key information, and Seed2 to the gateway.

After receiving the third authentication information, the gateway decrypts the third authentication information, and extracts third valid data from the third authentication information for third authentication. Exemplarily, the gateway may extract KeyData+Seed2 from RND3+KeyData+Seed2, and performs authentication thereon based on the previously stored Seed2. If the extracted Seed2 matches the stored Seed2, the third authentication succeeds. The primary anti-theft authentication process ends, and the vehicle basic function is activated. Through the above steps, the vehicle body controller securely transmits the key information to the gateway by means of the two-way authentication, so as to partially activate vehicle functions.

Figure 3:
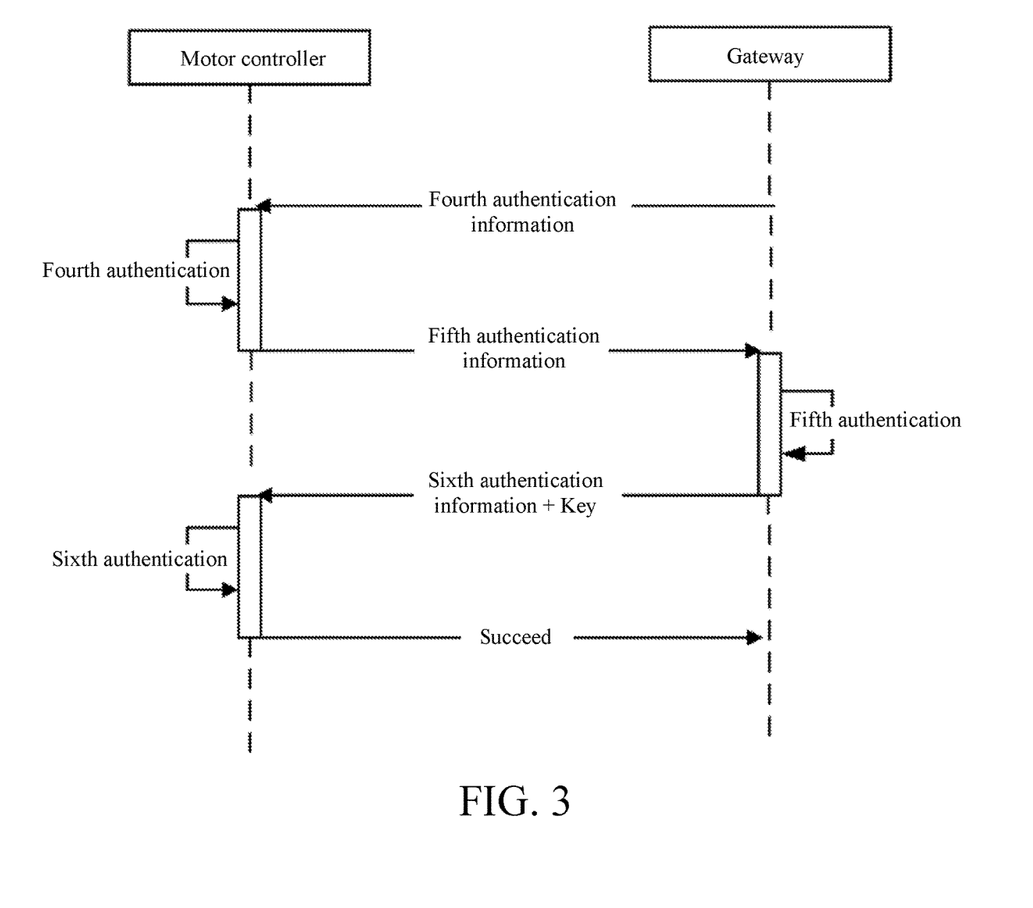
FIG. 3 is a schematic flowchart of a secondary anti-theft authentication process according to an embodiment of the disclosure.

Referring to FIG. 3, FIG. 3 is a schematic flowchart of a secondary anti-theft authentication process according to an embodiment of the disclosure.

Exemplarily, the secondary anti-theft authentication between the gateway and the motor controller is performed when one or more of the following conditions are met: the primary anti-theft authentication has succeeded; and the presence of a driver has been detected.

As shown in FIG. 3, the gateway first generates fourth authentication information and transmits the fourth authentication information to the motor controller. Exemplarily, the gateway may generate and store a fourth random number (RND4) and a fourth seed (Seed4), encrypt the fourth random number and the fourth seed together with the vehicle identification number (e.g., the last 8 bytes of VIN), and transmit the encrypted fourth random number, fourth seed, and vehicle identification number to the motor controller.

After receiving the fourth authentication information, the motor controller decrypts the fourth authentication information, and extracts fourth valid data from the fourth authentication information for fourth authentication. Exemplarily, the motor controller may extract Seed4+VIN from RND4+Seed4+VIN, and performs authentication thereon based on the VIN information stored in the EOL process. If the extracted VIN information matches the stored VIN, the fourth authentication succeeds.

The motor controller transmits fifth authentication information to the gateway after the fourth authentication succeeds. Exemplarily, the motor controller may generate and store a fifth random number (RND5) and a fifth seed (Seed5), encrypt the fifth random number and the fifth seed together with the fourth seed (Seed4), and transmit the encrypted fifth random number, fifth seed, and fourth seed to the gateway.

After receiving the fifth authentication information, the gateway decrypts the fifth authentication information, and extracts fifth valid data from the fifth authentication information for fifth authentication. Exemplarily, the gateway may extract Seed5+Seed4 from RND5+Seed5+Seed4, and performs authentication thereon based on the previously stored Seed4. If the extracted Seed4 matches the stored Seed4, the fifth authentication succeeds.

The gateway transmits sixth authentication information and the key information (KeyData) to the motor controller after the fifth authentication succeeds. Exemplarily, the gateway may generate a sixth random number (RND6), encrypt the sixth random number together with the key information and Seed5, and transmit the encrypted sixth random number, key information, and Seed5 to the motor controller.

After receiving the sixth authentication information, the motor controller decrypts the sixth authentication information, and extracts sixth valid data from the sixth authentication information for sixth authentication. Exemplarily, the motor controller may extract KeyData+Seed5 from RND6+KeyData+Seed5, and performs authentication thereon based on the previously stored Seed5. If the extracted Seed5 matches the stored Seed5, the sixth authentication succeeds.

Exemplarily, the gateway performs the above steps with the front motor controller and the rear motor controller respectively. If both authentications succeed, the secondary anti-theft authentication process ends and the vehicle driving function is activated. Through the above steps, the gateway securely transmits the key information to the front motor controller and the rear motor controller by means of the two-way authentication, so as to activate the vehicle driving function, that is, the vehicle is allowed to shift to "drive gear (D gear)" or "reverse gear (R gear)".

Figure 4:
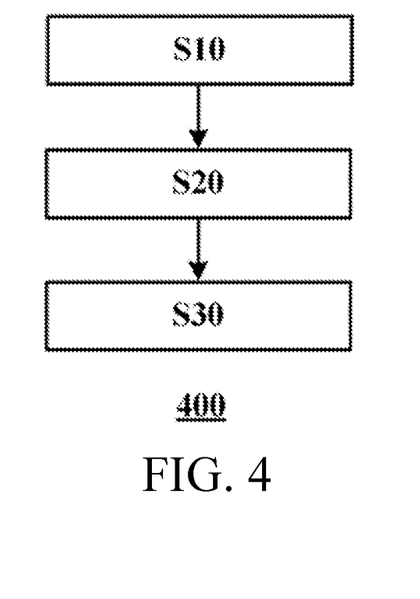
FIG. 4 is a schematic flowchart of a method 400 for vehicle anti-theft authentication according to an embodiment of the disclosure.

Referring to FIG. 4, FIG. 4 is a schematic flowchart of a method 400 for vehicle anti-theft authentication according to an embodiment of the disclosure.

Step S10: A vehicle body controller determines whether key information in a vehicle key matches preset information. If the match succeeds, the following key domain authentication phase is entered; and if the match fails, the whole authentication process fails and ends.

Step S20: Perform primary anti-theft authentication between the vehicle body controller and a gateway in a case of matching, to determine whether to activate a vehicle basic function. If the primary anti-theft authentication succeeds, the vehicle basic function is activated; and if the primary anti-theft authentication fails, the whole authentication process fails and ends.

Step S30: Perform secondary anti-theft authentication between gateway and a power controller in a case that a preset condition is met, to determine whether to activate a vehicle driving function. The preset condition includes that the primary anti-theft authentication has succeeded, and may further include that presence of a driver has been detected. If the secondary anti-theft authentication succeeds, the vehicle driving function is activated; and if the secondary anti-theft authentication fails, the whole authentication process fails and ends.

The specific steps related to the primary anti-theft authentication and the secondary anti-theft authentication have been described above, which is not detailed herein.

According to still another aspect, the disclosure provides a computer-readable storage medium storing program instructions executable by a processor. The program instructions, when executed by the processor, perform the method for vehicle anti-theft authentication as described in any one of the foregoing embodiments according to the aspect of the disclosure.

According to still another aspect, the disclosure provides a vehicle, including the system for vehicle anti-theft authentication as described in any one of the foregoing embodiments according to the aspect of the disclosure.

It should be understood that some of the block diagrams shown in the drawings of the disclosure are functional entities, and do not necessarily have to correspond to physically or logically independent entities. These functional entities may be implemented in the form of software, in one or more hardware modules or integrated circuits, or in different networks and/or processor apparatuses and/or micro-controller apparatuses.

It should also be understood that in some alternative embodiments, the functions/steps included in the foregoing method may not occur in the order shown in the flowchart. For example, two functions/steps shown in sequence may be executed substantially simultaneously or even in a reverse order. This specifically depends on the functions/steps involved.

On one hand, the embodiments according to the disclosure employ the key domain authentication between the vehicle body controller and the gateway and the transmission system authentication between the gateway and the power controller. Through the multiple authentications, the security of the anti-theft system is improved, thereby reducing the possibility of vehicle theft, and the step-by-step activation of vehicle functions is implemented.

Through the multiple authentications, the security of the anti-theft system is improved, thereby reducing the possibility of vehicle theft, and the step-by-step activation of vehicle functions is implemented.

On the other hand, some embodiments according to the disclosure enhance the complexity of ciphertext and the difficulty of password cracking by generating the random numbers, encryption calculations, etc., thereby ensuring the authentication reliability.

The foregoing disclosure is not intended to limit the disclosure to specific forms or particular application fields that are disclosed. Therefore, it is contemplated that in view of the disclosure, various alternative embodiments and/or modifications, whether clearly described or implied in this specification, of the disclosure are possible. When the embodiments of the disclosure are described as such, those of ordinary skill in the art would appreciate that changes may be made in forms and details without departing from the scope of the disclosure. Therefore, the disclosure is subject only to the claims.

What is claimed is:

1. A method for vehicle anti-theft authentication, comprising the steps of:
    determining whether key information in a vehicle key matches preset information;
    performing primary anti-theft authentication between a vehicle body controller and a gateway in a case of matching, to determine whether to activate a vehicle basic function; and
    performing secondary anti-theft authentication between the gateway and a power controller in a case of meeting a preset condition, to determine whether to activate a vehicle driving function;
    wherein the preset condition comprises that the vehicle basic function has been activated.

2. The method according to claim 1, wherein,
    the primary anti-theft authentication is one-way authentication or two-way authentication; and
    the secondary anti-theft authentication is one-way authentication or two-way authentication;
    preferably, the primary anti-theft authentication comprises:
        performing, by the gateway, first authentication according to first authentication information received from the vehicle body controller, and transmitting second authentication information to the vehicle body controller in a case that the first authentication succeeds;
        performing, by the vehicle body controller, second authentication according to the second authentication information received from the gateway, and transmitting third authentication information and the key information to the gateway in a case that the second authentication succeeds; and
        performing, by the gateway, third authentication according to the third authentication information received from the vehicle body controller, and activating the vehicle basic function in a case that the third authentication succeeds;
    preferably, the first authentication information comprises: a vehicle identification number, or an immobilizer security key, or a combination thereof;
    preferably, the secondary anti-theft authentication comprises:
        performing, by the power controller, fourth authentication according to fourth authentication information received from the gateway, and transmitting fifth authentication information to the gateway in a case that the fourth authentication succeeds;
        performing, by the gateway, fifth authentication according to the fifth authentication information received from the power controller, and transmitting sixth authentication information and the key information to the power controller in a case that the fifth authentication succeeds; and
        performing, by the power controller, sixth authentication according to the sixth authentication information received from the gateway, and activating the vehicle driving function in a case that the sixth authentication succeeds; and
    preferably, the fourth authentication information comprises: the vehicle identification number, or the immobilizer security key, or a combination thereof.

3. The method according to claim 1, wherein the performing secondary anti-theft authentication between the gateway and a power controller comprises:
    performing the secondary anti-theft authentication between the gateway and a front motor controller; and
    performing the secondary anti-theft authentication between the gateway and a rear motor controller.

4. The method according to claim 1, wherein the preset condition further comprises:
    one or more sensors determine that a driver is present.

5. A system for vehicle anti-theft authentication, comprising:
    a vehicle body controller, configured to determine whether key information in a vehicle key matches preset information;
    a gateway, configured to perform primary anti-theft authentication with the vehicle body controller in a case that the key information matches the preset information, to determine whether to activate a vehicle basic function; and a power controller, configured to perform secondary anti-theft authentication with the gateway in a case of meeting a preset condition, to determine whether to activate a vehicle driving function;

wherein the preset condition comprises that the vehicle basic function has been activated.

6. The system according to claim 5, wherein
the primary anti-theft authentication is one-way authentication or two-way authentication; and
the secondary anti-theft authentication is one-way authentication or two-way authentication;
preferably, the primary anti-theft authentication comprises:
performing, by the gateway, first authentication according to first authentication information received from the vehicle body controller, and transmitting second authentication information to the vehicle body controller in a case that the first authentication succeeds;
performing, by the vehicle body controller, second authentication according to the second authentication information received from the gateway, and transmitting third authentication information and the key information to the gateway in a case that the second authentication succeeds; and
performing, by the gateway, third authentication according to the third authentication information received from the vehicle body controller, and activating the vehicle basic function in a case that the third authentication succeeds;
preferably, the first authentication information comprises: a vehicle identification number, or an immobilizer security key, or a combination thereof;
preferably, the secondary anti-theft authentication comprises:
performing, by the power controller, fourth authentication according to fourth authentication information received from the gateway, and transmitting fifth authentication information to the gateway in a case that the fourth authentication succeeds;
performing, by the gateway, fifth authentication according to the fifth authentication information received from the power controller, and transmitting sixth authentication information and the key information to the power controller in a case that the fifth authentication succeeds; and
performing, by the power controller, sixth authentication according to the sixth authentication information received from the gateway, and activating the vehicle driving function in a case that the sixth authentication succeeds; and
preferably, the fourth authentication information comprises: the vehicle identification number, or the immobilizer security key, or a combination thereof.

7. The system according to claim 5, wherein the power controller comprises a front motor controller and a rear motor controller, and the front motor controller and the rear motor controller are configured to respectively perform the secondary anti-theft authentication with the gateway.

8. The system according to claim 5, wherein the preset condition further comprises:
one or more sensors determine that a driver is present.

9. A computer-readable storage medium having instructions stored therein, wherein the instructions, when executed by a processor, cause the processor to perform the method according to claim 1.

10. A vehicle, comprising the system according to claim 5.

11. A computer-readable storage medium having instructions stored therein, wherein the instructions, when executed by a processor, cause the processor to perform the method according to claim 2.

12. A computer-readable storage medium having instructions stored therein, wherein the instructions, when executed by a processor, cause the processor to perform the method according to claim 3.

13. A computer-readable storage medium having instructions stored therein, wherein the instructions, when executed by a processor, cause the processor to perform the method according to claim 4.

14. A vehicle, comprising the system according to claim 6.

15. A vehicle, comprising the system according to claim 7.

16. A vehicle, comprising the system according to claim 8.

* * * * *